United States Patent
Sahay et al.

(10) Patent No.: US 8,358,833 B2
(45) Date of Patent: Jan. 22, 2013

(54) RECOVERING 3D STRUCTURE USING BLUR AND PARALLAX

(75) Inventors: Rajiv Ranjan Sahay, Chennai (IN); Rajagopalan Ambasamudram Narayanan, Chennai (IN)

(73) Assignee: Indian Institute of Technology Madras, Chennai (IN)

( * ) Notice: Subject to any disclaimer, the term of this patent is extended or adjusted under 35 U.S.C. 154(b) by 449 days.

(21) Appl. No.: 12/768,467

(22) Filed: Apr. 27, 2010

(65) Prior Publication Data

US 2011/0262030 A1   Oct. 27, 2011

(51) Int. Cl.
*G06K 9/00* (2006.01)
(52) U.S. Cl. .................................... 382/154; 382/255
(58) Field of Classification Search ................. 382/154, 382/254, 255, 276
See application file for complete search history.

(56) References Cited

U.S. PATENT DOCUMENTS

2008/0170067 A1* 7/2008 Kim et al. ............... 345/419
2008/0232680 A1* 9/2008 Berestov et al. ......... 382/154

OTHER PUBLICATIONS

Aydin, T., et al., "A New Adaptive Focus Measure for Shape From Focus," British Machine Vision Conference, 2008.
Besag, J., "Spatial Interaction and the Statistical Analysis of Lattice Systems" Journal of the Royal Statistical Society. Series B (Methodological), vol. 36, No. 2 (1974), pp. 192-236.
Favaro, P., et al., "A Geometric Approach to Shape from Defocus," IEEE Transactions on Pattern Analysis and Machine Intelligence, vol. 27, No. 3, Mar. 2005.
Nayar, S., et al., "Shape from Focus," IEEE Transactions on Pattern Analysis and Machine Intelligence, vol. 16, No. 8, Aug. 1994.
Noguchi, M., et al., "Microscopic Shape from Focus Using Active Illumination," Proceedings of the International Conference on Pattern Recognition, 147-152 (1994).
Pentland, A., "A New Sense for Depth of Field," IEEE Transactions on Pattern Analysis and Machine Intelligence, vol. PAMI-9, No. 4, Jul. 1987.
Pradeep, K.S., et al., "Improving Shape from Focus Using Defocus Information," icpr, vol. 1, pp. 731-734, 18th International Conference on Pattern Recognition (ICPR'06) vol. 1, 2006.
Subbarao, M., "Accurate Recovery of Three-Dimensional Shape from Image Focus," IEEE Transactions on Pattern Analysis and Machine Intelligence, vol. 17, No. 3, Mar. 1995.
Subbarao, M., "Parallel Depth Recovery by Changing Camera Parameters," Second International Conference on Computer Vision, 149-155, (1988).
Li, S.Z., "Markov Random Field Modeling in Computer Vision," Springer-Verlag, Tokyo, 1995, (Chapter 1, Section 1.1.4).
Walder, C., et al., "Markerless 3D Face Tracking," Pattern Recognition: 31st DAGM Symposium, 41-50. (Eds.) Denzler, J., G. Notni, H. Süsse, Springer, Berlin, Germany (Sep. 2009).
Chaudhuri, S., et al., "Depth From Defocus: A Real Aperture Imaging Approach," Springer-Verlag, New York, 1999. (Chapter 2, section 2.2.2, p. 18-19).

(Continued)

*Primary Examiner* — Andrew W Johns
(74) *Attorney, Agent, or Firm* — Foley & Lardner LLP

(57) ABSTRACT

A system and method for generating a focused image of an object is provided. The method comprises obtaining a plurality of images of an object, estimating an initial depth profile of the object, estimating a parallax parameter and a blur parameter for each pixel in of the plurality of images and generating a focused image and a corrected depth profile of the object using a posterior energy function. The posterior energy function is based on the estimated parallax parameter and the blur parameter of each pixel in the plurality of images.

20 Claims, 3 Drawing Sheets

OTHER PUBLICATIONS

Sahay, R., et al., "Real Aperture Axial Stereo: Solving for Correspondences in Blur," Pattern Recognition, Lecture Notes in Computer Science, vol. 5748, Springer Berlin Heidelberg, 2009, p. 362-371.

Wang, Y.F., et al., "3D Shape and Motion Analysis from Image Blur and Smear: A Unified Approach," Lecture Notes in Computer Science; vol. 1352, Proceedings of the Third Asian Conference on Computer Vision—vol. II, 400-407, 1998.

* cited by examiner

RECOVERING 3D STRUCTURE USING BLUR AND PARALLAX

BACKGROUND

In many applications such as medical imaging applications, a set of images are used to reconstruct a single focused image and 3D depth profile for visualization. However, the reconstructed image may suffer degradation due to existence of blur and parallax in the original set of images. Blur reduces the sharpness and contrast of the image and occurs when an object is not in complete focus while capturing an image. Parallax causes an apparent displacement in a position of the object while viewed in different images.

These types of defects can be common in images generated by medical diagnosis equipment such as endoscopy, laparoscopy etc. In general, images captured with a moving camera tend to have errors associated with blur and parallax. Specifically, in medical imaging modalities, such inaccurate or degraded images may result in wrong diagnosis.

Object side telecentric lenses are often used to reduce the effects of blur and parallax. However, the size of telecentric lenses may often be comparable to the size of the object itself. Therefore, using such lenses in imaging systems may increase the overall size of the system as well as it associated cost.

In most medical imaging techniques, the reconstructed image is a two dimensional representation of a target such as organs, tumors, bones, and the like. However, these imaging techniques, are not adapted to recover a three dimensional structure of the object. The three dimensional structure of the object or a depth profile may be derived using algorithms based on the shape-from-focus (SFF) principle.

The shape from focus algorithms operates under an assumption that the images do not contain errors due to parallax. Therefore, in images with a substantial amount of parallax, the depth profile of the object estimated using these algorithms may be incorrect.

SUMMARY

Briefly, according to one embodiment of the present technique, a method for generating a focused image of an object is provided. The method comprises obtaining a plurality of images of the object, estimating an initial depth profile of the object, estimating a parallax parameter and a blur parameter for each pixel in each of the plurality of images and generating a focused image and a corrected depth profile of the object using a posterior energy function. The posterior energy function is based on the estimated parallax parameter and blur parameter for each pixel in the plurality of images.

In another embodiment, a system for obtaining a focused image of an object is provided. The system comprises an image sensor configured to obtain a plurality of images of the object. The system further comprises processing circuitry configured to estimate an initial depth profile of the object, estimate a parallax parameter and a blur parameter for each pixel in of the plurality of images and generate a focused image and a corrected depth profile of the object using a posterior energy function. The posterior energy function is based on the estimated parallax parameter and the blur parameter of each pixel in the plurality of images.

In another embodiment, a method for generating a focused image of an object is provided. The method comprises obtaining a plurality of images of an object, estimating an initial depth profile of the object, selecting a subset of images from the plurality of images, estimating a parallax parameter and a blur parameter for each pixel in of the subset of images and generating a focused image and a corrected depth profile of the object by applying a posterior energy function on the subset of images. The posterior energy function is based on the estimated parallax parameter and the blur parameter of each pixel in the plurality of images.

DETAILED DESCRIPTION

Figure 1:
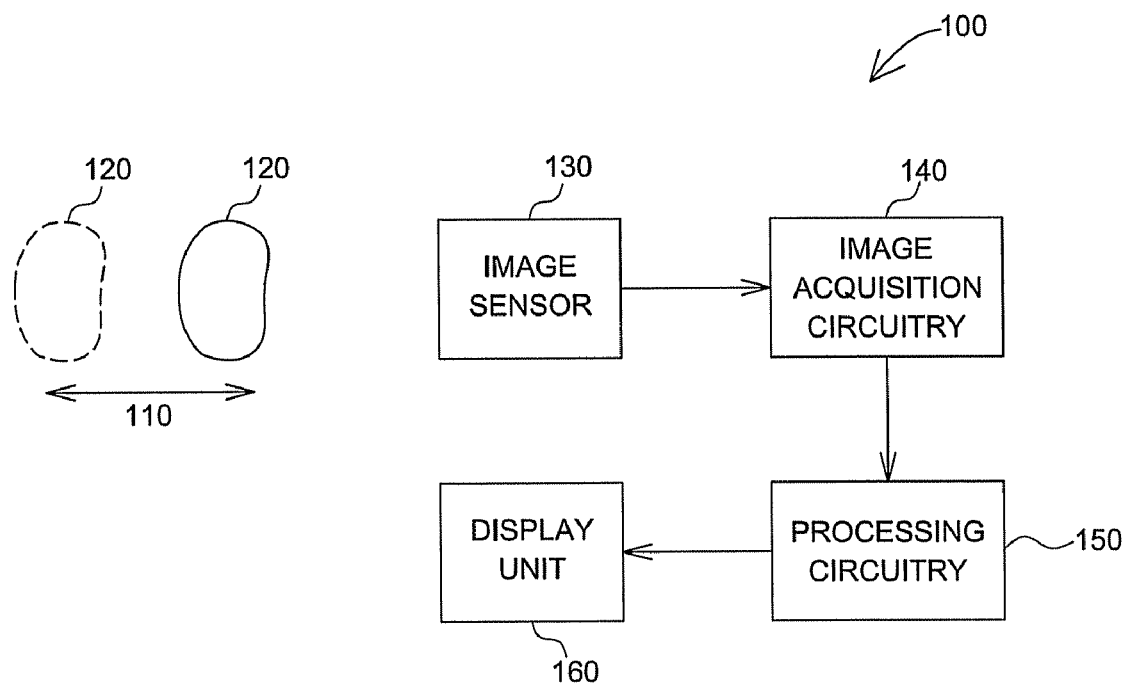
FIG. 1 is a block diagram of an example imaging system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

An embodiment is directed to generating a focused image and a depth profile of an object. An embodiment provides a method generating a focused image and a depth profile of an object from a set of images as will be described herein. The following description is with reference to medical imaging applications, however it should be understood that the techniques described herein may be applied in various other image processing applications as well.

FIG. 1 is a block diagram of an example imaging system implemented according to one aspect of the present technique. Imaging system 100 is configured to generate a focused image and a depth profile of object 120. Examples of imaging system include endoscopy systems, laparoscopy systems, digital photography and the like. Imaging system 100 comprises an image sensor 130, image acquisition circuitry 140, processing circuitry 150 and display unit 160. Each block is described in further detail below.

Image sensor 130 is configured to obtain a plurality of images of object 120 placed at corresponding plurality of positions along direction denoted by reference numeral 110. The object is moved along the optical axis of the image sensor. In another embodiment, the image sensor is moved towards the object. In one embodiment, the object is moved in incremental distances of about 1 millimeter. In one embodiment, the image sensor comprises a single digital camera. Although, the image sensor is used to obtain the images in the embodiment described herein, it should be understood that the images may be obtained by accessing a memory device that stores the images.

The image acquisition circuitry 140 is configured perform initial processing on the image data received from image sensor 130. Such initial processing may include filtering of digital signals, scaling or dynamic range adjustments, and the like.

Processing circuitry 150 is configured to generate a focused image of the object. Processing circuitry 150 is further configured to generate a depth profile or a three dimensional structure of the object. The focused image and the depth profile are reconstructed by estimating a blur parameter and a parallax parameter for each pixel in the plurality of images. It may be noted that a pixel may include a blur parameter, a parallax parameter, or both or none. The focused image and the depth profile are reconstructed by minimizing a posterior energy function. In one embodiment, the posterior energy function is formulated using a Bayesian approach that adopts a maximum a-posteriori (MAP)—Markov random filed (MRF) framework. In one embodiment, the posterior energy function is formulated using a subset of images selected from the plurality of images to simultaneously reconstruct the focused image and the depth profile.

The posterior energy function is computed based on the estimated parallax parameter and the blur parameter of each pixel in the plurality of images. The focused image and the depth profile are displayed on display unit 160 or may be stored in a memory device (not shown). The manner in which the posterior energy function is computed is described in further detail below with reference to FIG. 2 and FIG. 3

Figure 2:
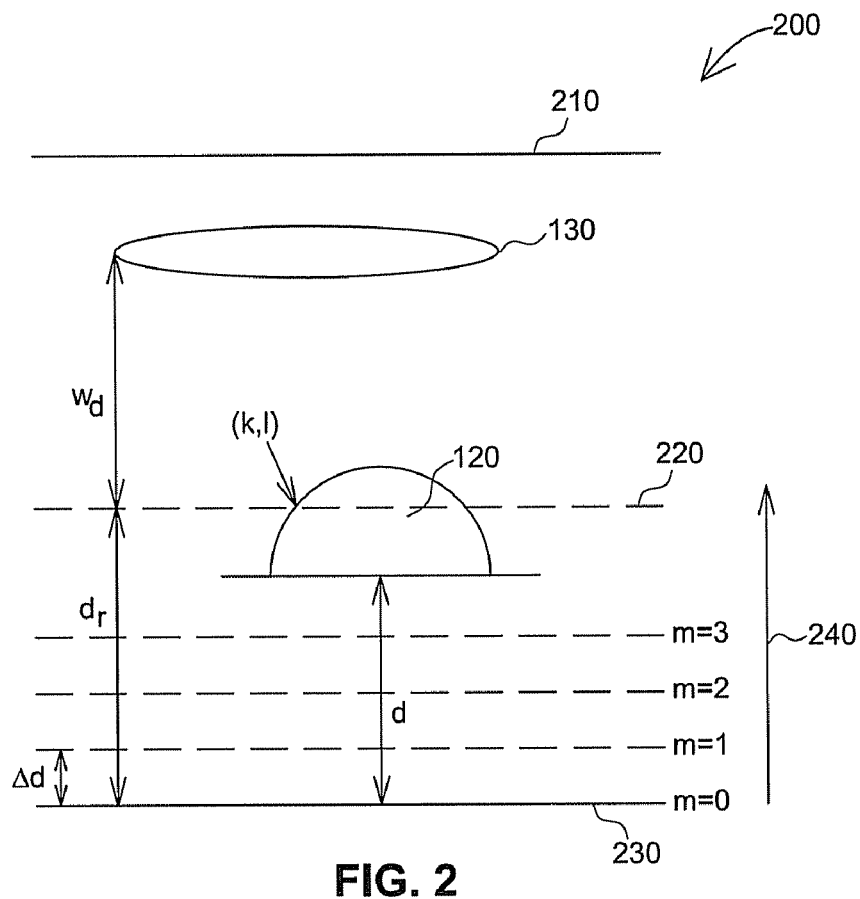
FIG. 2 is a diagram illustrating blur caused due to a movement of an object.

FIG. 2 is an optical diagram illustrating blur caused due to a movement of an object. The optical diagram 200 comprises the image plane 210, the focused plane 220 and the reference plane 230. The focused plane 220 is at a working distance '$w_d$' from the image sensor. The reference plane 230 is at a distance '$d_r$' from the focused plane 220. For ease of illustration, the image sensor is represented as an optical lens.

Initially, the object 120 is placed at the reference plane 230. Thereafter, the object is translated in an upward direction as denoted by reference numeral 240 towards the image sensor. In one embodiment, the object is translated in increments of fixed finite distances denoted by '$\Delta d$'. At every translation stage denoted by m=0, 1, 2 and 3, an image of the object 120 is captured by the image sensor.

Due to the finite depth-of-field of the image sensor and the three dimensional nature of the object, the images obtained at each translation stage are space-variantly blurred such that only a portion of the specimen is in focus. For example, as the object is moved towards the image sensor 130, a point (k, 1) on the object gradually comes into focus and will be in focus when the separation between the stage and the reference plane 230 is d=$\bar{d}$(k, 1). At this position, the point (k, 1) satisfies the lens law and is on the focused plane 220. If the object is moved further towards the image sensor, the point will blur again.

A point on the object which is at a distance D' away from the lens, is in focus only when it satisfies the lens law expressed as:

$$\frac{1}{f} = \frac{1}{D'} + \frac{1}{v}$$

where 'f' is the focal length of the lens and 'v' is the distance between the lens and the image plane. For distances D≠D', from the lens plane, the point will appear blurred.

The point spread function (PSF) of an image sensor defines its response to a point light source. A point light source at a distance D from the lens plane is imaged as a circular patch with radius '$r_b$' defined by the following equation:

$$r_b = Rv\left(\frac{1}{f} - \frac{1}{D'} - \frac{1}{v}\right)$$

where 'R' is a radius of an aperture of a lens in the image sensor. In one embodiment, the PSF is described by a circularly symmetric 2D Gaussian function with standard deviation $\sigma = \rho r_b$ where '$\rho$' is a image sensor constant.

When the object is moved in steps of $\Delta d$, for the $m^{th}$ image, the blur parameter for a point on the object whose image pixel coordinates are (k, 1) is expressed as $\sigma_m$(k, 1). If the separation between the stage and the reference plane is such that d=m$\Delta d$=$\bar{d}$(k, 1), then the point satisfies lens law and will appear in perfect focus and the blur parameter is zero. The blur parameter at a point in the reference image can be related to the blur parameter at the same point in the $m^{th}$ image of the stack as with the following equation:

$$\sigma_m(k, 1) = \sigma_0(k, 1) + \rho Rv\left(\frac{1}{w_d + \bar{d}(k, 1)} - \frac{1}{w_d + \bar{d}(k, 1) + m\Delta d}\right) \quad \text{Equation (1)}$$

Figure 3:
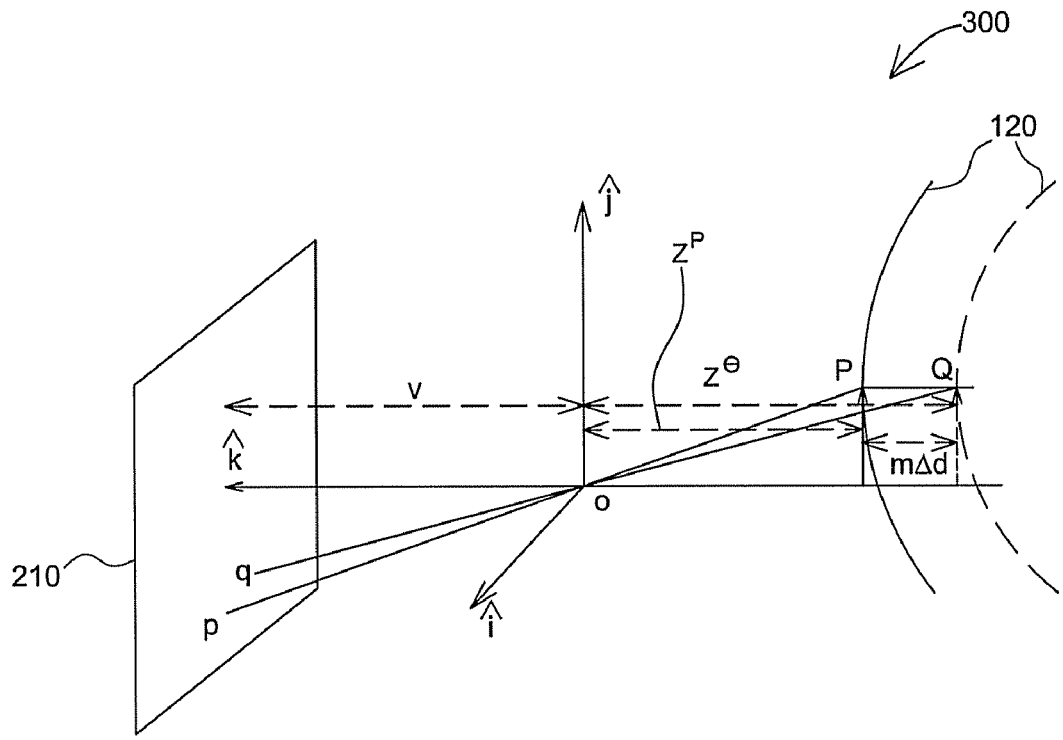
FIG. 3 is a diagram illustrating parallax caused due to a movement of an object.

Using the above equation, a blur map is estimated. The blur map included the blur parameter for all pixels in the image. The structure of the 3D object is related to both the space-variant defocusing as described above and motion parallax affecting the images. The dependence of parallax effects on the 3D structure is described below FIG. 3 is an optical diagram illustrating parallax caused due to a movement of an object. Object 120 is moved relative to a pinhole 'O' along an axial direction. It may be noted that the pinhole may also be moved relative to the object 120. In another embodiment, the pinhole and the object are moved relative to each other.

A point 'P' on the object with coordinates P ($X^P$, $Y^P$, $Z^P$) is moved to point Q with coordinates Q ($X^Q$, $Y^Q$, $Z^Q$) along the Z-axis by a distance denoted by 'm$\Delta d$' and away from the pinhole denoted by O. The distances of the points P and Q from the pinhole 'O' are denoted by $Z^P$ and ZQ respectively.

The point P is imaged at 'p' on the image plane 210 and has coordinates p(x, y) and is assumed as the reference plane. When the object is moved away from the pinhole 'O' by an amount 'm$\Delta d$', the point Q is imaged at 'q' with coordinates (x', y') on the image plane. The corresponding image is the $m^{th}$ image in the plurality of images. Thus x, x', y and y' is represented by the following equations:

$$x = \frac{vX^P}{Z^P}, \quad x' = \frac{vX^Q}{Z^Q}, \quad y = \frac{vY^P}{Z^P}, \quad y' = \frac{vY^Q}{Z^Q} \quad \text{Equation (2)}$$

where 'v' is a distance between pinhole O and the image plane. Since the motion of the object relative to the pinhole is along one direction and the object is moved along the optical axis, $X^P$=$X^Q$, $Y^P$=$Y^Q$ and $Z^Q$=$Z^P$+m$\Delta d$. As was described in FIG. 1, a point (k,1) is in focus at a distance of $w_d$+m$\Delta d$ from the image sensor 130. Therefore, $Z^P$ may also be written as $w_d$+$\bar{d}$(x,y). Therefore, $Z^Q$=$w_d$+$\bar{d}$(x, y)+m$\Delta d$. Thus, x' and y' may be represented as follows:

$$x' = \frac{x(w_d + \bar{d}(x, y))}{w_d + \bar{d}(x, y) + m\Delta d} \quad \text{Equation (3)}$$

$$y' = \frac{y(w_d + \bar{d}(x, y))}{w_d + \bar{d}(x, y) + m\Delta d} \quad \text{Equation (4)}$$

As can be noted from the above equations, pixel motion denoted by x, y is expressed in the form of $\bar{d}(x,y)$ which in turn represents three dimensional information of the object. Using the above equations, the posterior energy function is derived as described below.

Consider 'N' images, $\{y_m(i, j)\}$, where m=0 through N−1, each of size M×M, from the plurality of images. It is assumed that the dimensions of the image are equal in this example. However, it should be understood by one skilled in the art that images of unequal dimensions may also be used. Also, it is assumed that the images are derived from a single focused image $\{x(i,j)\}$ of the object. The scaled and defocused images can be related to the focused image by a degradation model represented below:

$$y_m = H_m(\bar{d})W_m(\bar{d})x + n_m \quad \text{Equation (5)}$$

where '$y_m$' is a lexicographically arranged vector of size M×M×1 derived from the $m^{th}$ defocused and scaled image, $W_m$ describes the motion of the pixels in the $m^{th}$ image, $H_m$ is a blur map for the $m^{th}$ image, and $n_m$ is the Gaussian noise vector in the $m^{th}$ image.

The above equation (5) establishes a relationship between space variant blurring and parallax effects in the captured images with a three dimensional structure of the object. The degree of space-variant defocus blur induced at each point in the image of a 3D scene depends on the depth of the object from the image sensor. Also, the pixel motion or parallax is a function of the 3D structure of the object.

In an embodiment, for a given object, the focused reference image is acted upon by a σ0 blur map corresponding to the original shape of the object. For the $m^{th}$ defocused image, the corresponding blur map is $\sigma_m$ resulting from Equation (1). The space-variant defocusing mechanism operates by defocusing the focused image using the value of the blur parameter at every corresponding pixel. For example, for a second defocused image (m=1), $\sigma_1$ denotes the blur map corresponding to the unscaled second image. Equation (3) and equation (4) is used to determine the location (x, y) in the focused reference image which maps to the location (x', y') in the second focused image due to pixel motion. Since the image feature in the reference image at (x, y) has shifted in position to (x', y') in the second image, the value of the blur parameter at (x', y') is $\sigma_1(x, y)$.

In one embodiment, the focused image and the depth profile is simultaneously recovered by modeling the structure of the object by using Gauss-Markov random fields (GMRFs) with a first-order neighborhood. In one embodiment, probability density functions (PDF) are modeled to recover the focused image and the depth profile.

$$P(\bar{d}) = \frac{1}{z_{\bar{d}}} \exp\left[-\sum_{c \varepsilon C_{\bar{d}}} V_c^{\bar{d}}(\bar{d})\right]$$

$$P(x) = \frac{1}{z_x} \exp\left[-\sum_{c \varepsilon C_x} V_c^{\bar{d}}(x)\right]$$

where $P(\bar{d})$ is the PDF for the depth profile, $P(x)$ is the PDF for the focused image, $Z_{\bar{d}}$ and $Z_x$ are partition functions, 'c' is a clique, 'C' is the set of all cliques, $V_c^{\bar{d}}(\bar{d})$ and $V_c^x(x)$ are potentials associated with clique 'c'.

Consider a set of 'p' images chosen from a stack of 'N' images and denoted by O={$u_1, u_2$ through $u_p$}, where $u_i$ is the image number. Using Bayes' rule, the focused image and the depth profile can be written as follows:

$$\log P(\bar{d},x|y_{u_1},y_{u_2}\ldots y_{u_p}) = \log P(y_{u_1},y_{u_2}\ldots y_{u_p}|\bar{d},x) + \log P(\bar{d}) + \log P(x)$$

where $y_{u_1}, y_{u_2} \ldots y_{u_p}$ are images from the stack of 'N' images. The terms '$\log P(\bar{d}) + \log P(x)$' represents a smoothing filter. From the above equation, the posterior energy function can represented as follows:

$$U^p(\bar{d}, x) = \sum_{m \varepsilon O} \frac{\|y_m - H_m(\bar{d})W_m(\bar{d})x\|^2}{2\sigma_\eta^2} + \lambda_{\bar{d}} \sum_{c \varepsilon C_{\bar{d}}} V_c^{\bar{d}}(\bar{d}) + \lambda_x \sum_{c \varepsilon C_x} V_c^x(x) \quad \text{Equation (6)}$$

where $\sigma_\eta^2$ is the Gaussian noise, $\lambda_{\bar{d}}$ and $\lambda_x$ are smoothness parameters for the estimation of the depth map and the focused images respectively. The manner in which the focused image and the depth profile are recovered by minimizing the posterior energy function shown in equation (6) is described in the flowchart below.

Figure 4:
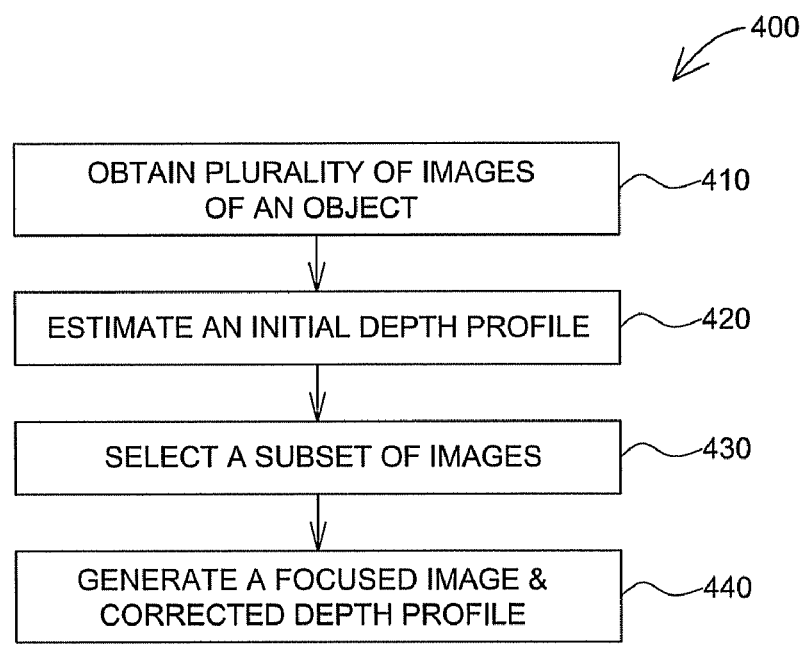
FIG. 4 is a flow chart illustrating an example method by which a focused image and a depth profile of an object is generated.

FIG. 4 is a flow chart illustrating one method by which a focused image and a depth profile of an object is generated. The process 400 is applied on a plurality of images of a three dimensional object to obtain a focused image and a depth profile of the object. Each step in the process is described in further detail below.

At step 410, a plurality of images of the object is obtained. The plurality of images may be obtained using an image sensor or may be accessed from a memory device. In one embodiment, a single digital camera is used to obtain the images. The images are obtained while the object or the camera is translated in a single direction. In one specific embodiment, the object is moved along the optical axis of the camera. In one embodiment, the object is moved over incremental distances of 1 millimeter away from the camera.

At step 420, an initial depth profile of the object is estimated. In one embodiment, the initial depth profile is estimated by using a shape from focus algorithm. An example of a shape from focus algorithm is found in an article entitled 'Shape from Focus' authored by Shree K. Nayar and Yasuo Nakagawa from IEEE Transactions on Pattern Analysis and Machine Intelligence, Vol. 16, no. 8, pp. 824-831, 1994.

At step 430, a subset of images is selected from the plurality of images. In one embodiment, the subset of images is selected by a user by examining the plurality of images captured by the image sensor. In one embodiment, the subset of images comprises four images.

At step 440, a focused image of the object and a corrected depth profile of the object are generated by minimizing a posterior energy function as described in equation (6).

The above described techniques can be used in various applications and specifically in medical imaging applications such as endoscopy, laparoscopy, etc. The technique can also be applied to stereoscopic images obtained by the use of a single camera. Since the posterior energy function uses both the blur parameter as well as the parallax parameter, the focused image generated is more accurate. Also, the technique obviates telecentric lens, thus enabling reduction in size of the equipment as well as its related costs. In addition, since the posterior energy function is applied only on a subset of the images, the computational complexity of the algorithm is substantially reduced. The technique described above can be implemented using a general computing device as described below.

Figure 5:
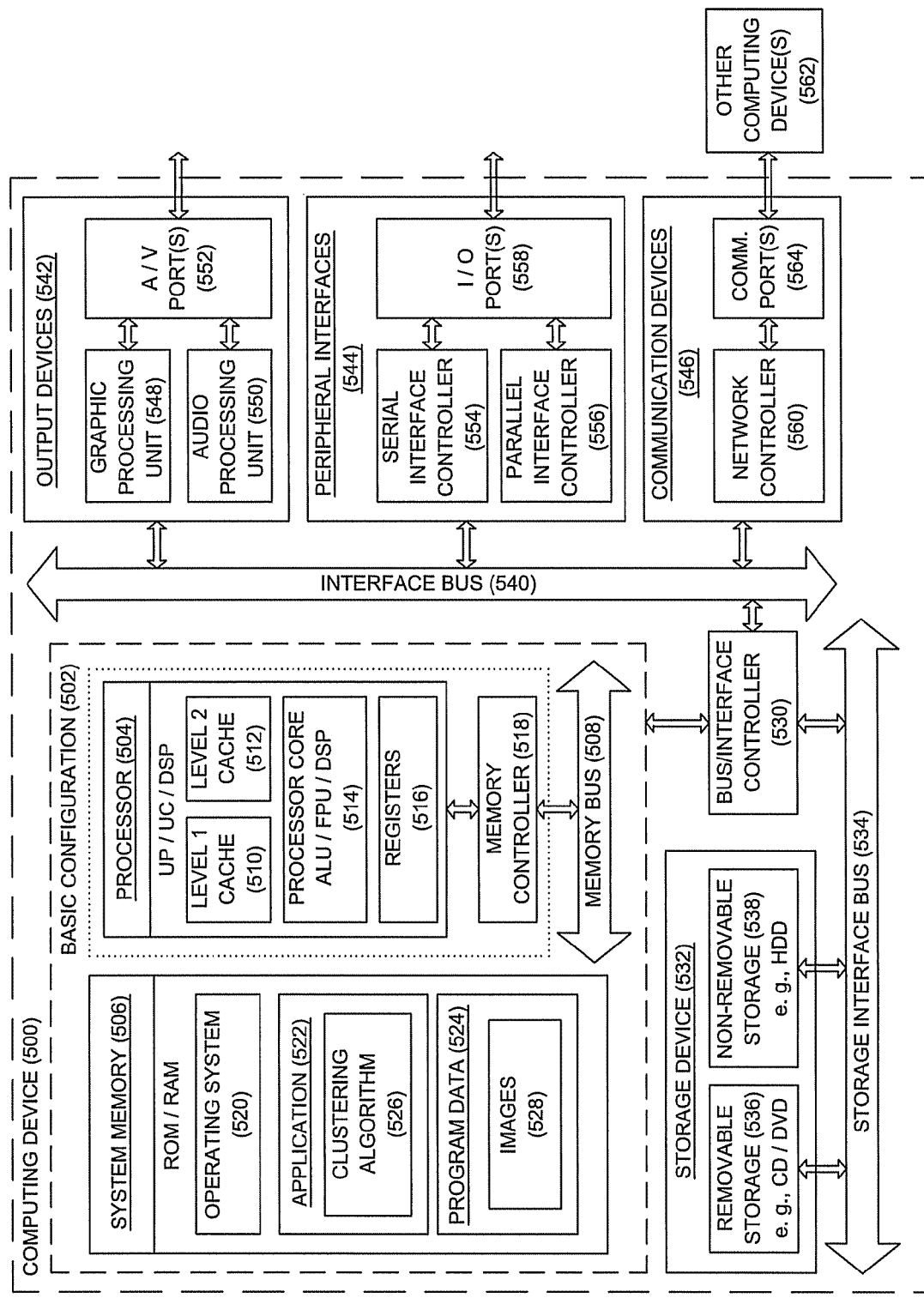
FIG. 5 is a block diagram of an embodiment of a computing device.
Figure 5:
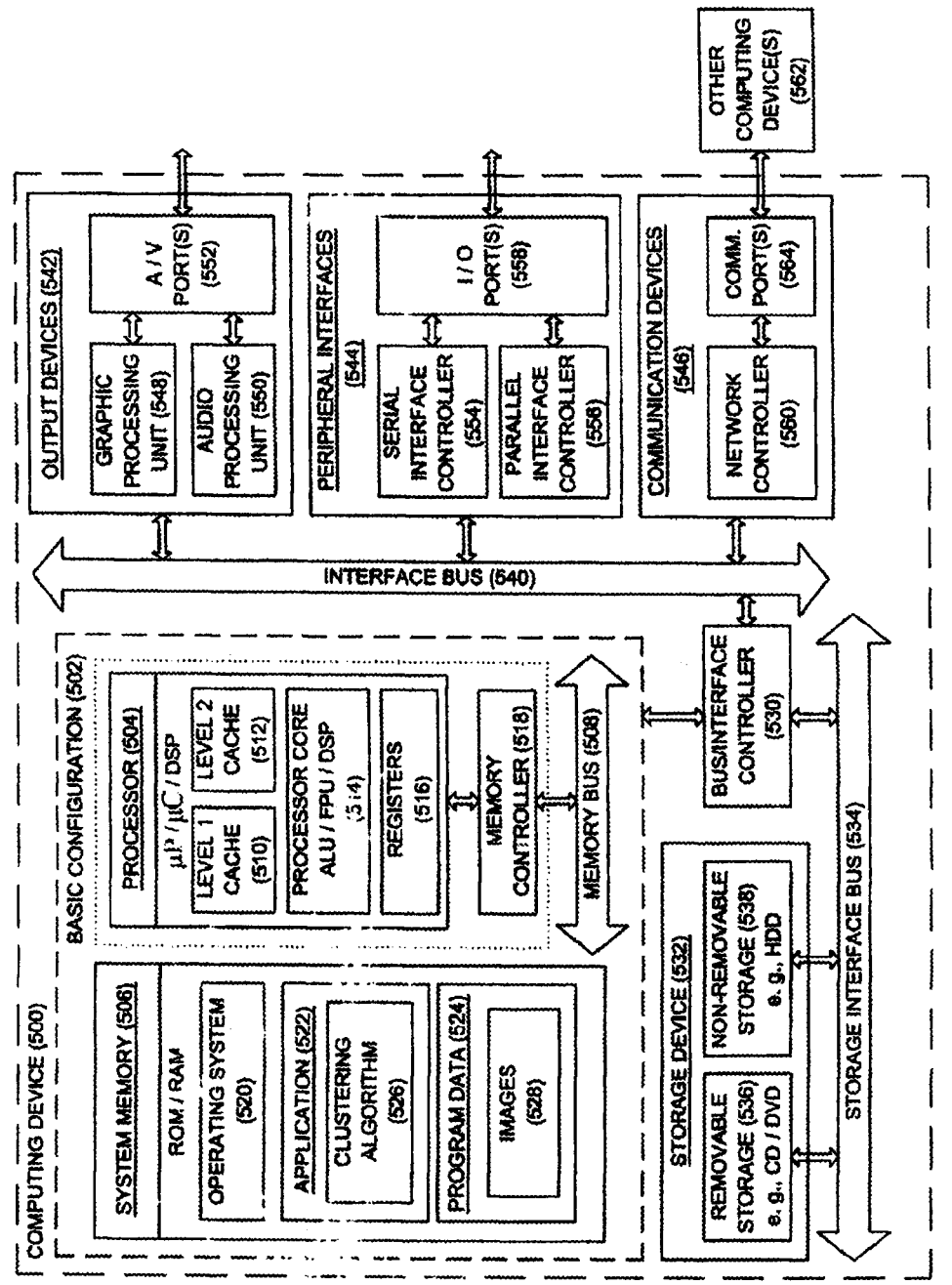

FIG. 5 is a block diagram illustrating an example computing device 500 that is arranged for generating a focused image and a depth profile of an object in accordance with the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor ($\mu$P), a microcontroller ($\mu$C), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include a posterior energy function algorithm 526 that is arranged to the functions as described herein including those described with respect to process 300 of FIG. 3. Program data 524 may include a set of images 528. In some embodiments, application 522 may be arranged to operate with program data 524 on operating system 520 such that a focused image and a depth profile of an object is generated as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for generating a focused image of an object, comprising:
    obtaining a plurality of images of the object;
    estimating an initial depth profile of the object;
    estimating a parallax parameter and a blur parameter for each pixel in each of the plurality of images; and
    generating a focused image and a corrected depth profile of the object using a posterior energy function, wherein the posterior energy function is based on the estimated parallax parameter and blur parameter for each pixel in the plurality of images.

2. The method of claim 1, further comprising selecting a subset of images from the plurality of images.

3. The method of claim 2, wherein the posterior energy function is applied to the subset of images.

4. The method of claim 1, wherein the posterior energy function comprises applying a smoothness constraint.

5. The method of claim 4, wherein the smoothness constraint is obtained by using Gauss-Markov random fields.

6. The method of claim 1, wherein the blur parameter and the parallax parameter are a function of a structure of the object.

7. The method of claim 1, wherein the plurality of images are obtained by moving the object over a plurality of incremental distances along one axis.

8. The method of claim 1, wherein the posterior energy function is represented by the following relation:

$$U^p(\bar{d}, x) = \sum_{m \in O} \frac{\|y_m - H_m(\bar{d})W_m(\bar{d})x\|^2}{2\sigma_\eta^2} + \lambda_{\bar{d}} \sum_{c \in C_{\bar{d}}} V_c^{\bar{d}}(\bar{d}) + \lambda_x \sum_{c \in C_x} (V_c^x)(x)$$

where 'x' is the focused image, $\bar{d}$ is the depth profile, '$y_m$' is a lexicographically arranged vector of size M×M×1 derived from an $m^{th}$ defocused and scaled image, $W_m$ describes the motion of the pixels in the $m^{th}$ image, $H_m$ is a blur map for the $m^{th}$ image, and $n_m$ is the Gaussian noise vector in the $m^{th}$ image, c' is a clique, 'C' is the set of all cliques, $V_c^{\bar{d}}(\bar{d})$ and $V_c^x(x)$ are potentials associated with clique 'c', $\sigma_\eta^2$ is the Gaussian noise, $\lambda_{\bar{d}}$ and $\lambda_x$ are smoothness parameters.

9. The method of claim 1, wherein the step of obtaining a plurality of images comprises obtaining at least two images.

10. A system for obtaining a focused image of an object, the system comprising:
    an image sensor configured to obtain a plurality of images of the object, processing circuitry configured to:
        estimate an initial depth profile of the object,
        estimate a parallax parameter and a blur parameter for each pixel in of the plurality of images; and generate a focused image and a corrected depth profile of the object using a posterior energy function, wherein the posterior energy function is based on the estimated parallax parameter and the blur parameter of each pixel in the plurality of images.

11. The system of claim 10, further comprising a display unit configured to display the plurality of images to enable a user to select a subset of images from the plurality of images.

12. The system of claim 11, wherein the posterior energy function is applied to the subset of images.

13. The system of claim 10, wherein the posterior energy function is represented by the following relation:

$$U^p(\overline{d}, x) = \sum_{m \in O} \frac{\|y_m - H_m(\overline{d})W_m(\overline{d})x\|^2}{2\sigma_\eta^2} + \lambda_{\overline{d}} \sum_{c \in C_{\overline{d}}} V_c^d(\overline{d}) + \lambda_x \sum_{c \in C_x} (V_c^x)(x)$$

where 'x' is the focused image, $\overline{d}$ is the depth profile, '$y_m$' is a lexicographically arranged vector of size M×M×1 derived from an $m^{th}$ defocused and scaled image, $W_m$ describes the motion of the pixels in the $m^{th}$ image, $H_m$ is a blur map for the $m^{th}$ image, and $n_m$ is the Gaussian noise vector in the $m^{th}$ image, c' is a clique, 'C' is the set of all cliques, $V_c^d(\overline{d})$ and $V_c^x(x)$ are potentials associated with clique 'c', $\sigma_\eta^2$ is the Gaussian noise, $\lambda_{\overline{d}}$ and $\lambda_x$ are smoothness parameters.

14. The system of claim 10, wherein the blur parameter and the parallax parameter are a function of a three dimensional structure of the object.

15. The system of claim 10, wherein the plurality of images are obtained by moving the object over a plurality of incremental distances along one axis.

16. A method for generating a focused image of an object, comprising:
 obtaining a plurality of images of an object,
 estimating an initial depth profile of the object,
 selecting a subset of images from the plurality of images;
 estimating a parallax parameter and a blur parameter for each pixel in of the subset of images; and
 generating a focused image and a corrected depth profile of the object by applying a posterior energy function on the subset of images, wherein the posterior energy function is based on the estimated parallax parameter and the blur parameter of each pixel in the plurality of images.

17. The method of claim 16, wherein the posterior energy function comprises applying a smoothness constraint.

18. The method of claim 17, wherein the smoothness constraint is obtained by using Gauss-Markov random fields.

19. The method of claim 16, wherein the blur parameter and the parallax parameter are a function of a structure of the object.

20. The method of claim 16, wherein the plurality of images are obtained by translating the object on one axis over a plurality of incremental distances.

* * * * *

UNITED STATES PATENT AND TRADEMARK OFFICE
CERTIFICATE OF CORRECTION

PATENT NO. : 8,358,833 B2
APPLICATION NO. : 12/768467
DATED : January 22, 2013
INVENTOR(S) : Sahay et al.

It is certified that error appears in the above-identified patent and that said Letters Patent is hereby corrected as shown below:

On the Title Page, in Item (57), under "ABSTRACT", in Column 2, Line 5, delete "in of the" and insert -- in the --, therefor.

Figure 5, sheet 3 of 3 should be deleted to appear as per attached sheet.

In Column 1, Line 58, delete "in of the" and insert -- in the --, therefor.

In Column 3, Line 53, delete "D'away" and insert -- D' away --, therefor.

In Column 4, Line 9, delete "is a" and insert -- is an --, therefor.

In Column 4, Line 33, delete "below" and insert -- below. --, therefor.

In Column 4, Line 45, delete "ZQ" and insert -- $Z^Q$ --, therefor.

In Column 5, Line 65, delete " $P(x) = \frac{1}{z_x} \exp\left[-\sum_{c \in C_x} V_c^{\vec{a}}(x)\right]$ " and insert -- $P(x) = \frac{1}{z_x} \exp\left[-\sum_{c \in C_x} V_c^x(x)\right]$ --, therefor.

In Column 10, Line 67, in Claim 10, delete "in of the" and insert -- in the --, therefor.

Signed and Sealed this
Ninth Day of April, 2013

Teresa Stanek Rea
*Acting Director of the United States Patent and Trademark Office*